United States Patent
Beigi et al.

(10) Patent No.: US 7,783,728 B2
(45) Date of Patent: Aug. 24, 2010

(54) CONCURRENT EVALUATION OF POLICIES WITH SYNCHRONIZATION

(75) Inventors: Mandis Sadr Mohammad Beigi, Tarrytown, NY (US); Murthy V Devarakonda, Peekskill, NY (US); Marc Adam Kaplan, Lewisboro, NY (US); Rohit Jain, New Delhi (IN); James Rubas, Yorktown Heights, NY (US); Upendra Sharma, New Delhi (IN); Akshat Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 903 days.

(21) Appl. No.: 10/995,598

(22) Filed: Nov. 22, 2004

(65) Prior Publication Data

US 2006/0112389 A1    May 25, 2006

(51) Int. Cl.
*G06F 15/177* (2006.01)
*G06F 15/16* (2006.01)
*H04L 12/28* (2006.01)

(52) U.S. Cl. .................. 709/220; 709/223; 709/238; 709/248; 370/392

(58) Field of Classification Search .............. 709/220, 709/223, 224, 238, 248; 370/392
See application file for complete search history.

(56) References Cited

U.S. PATENT DOCUMENTS

| | | | |
|---|---|---|---|
| 6,408,336 B1 * | 6/2002 | Schneider et al. ........... | 709/229 |
| 6,418,468 B1 * | 7/2002 | Ahlstrom et al. ............ | 709/223 |
| 6,430,576 B1 * | 8/2002 | Gates et al. .................. | 707/201 |
| 6,463,470 B1 * | 10/2002 | Mohaban et al. ............ | 709/223 |
| 6,473,851 B1 * | 10/2002 | Plutowski ...................... | 713/1 |
| 6,718,380 B1 * | 4/2004 | Mohaban et al. ............ | 709/223 |
| 7,130,882 B1 * | 10/2006 | Hudis et al. ................. | 709/203 |
| 7,219,142 B1 * | 5/2007 | Parekh et al. ............... | 709/223 |
| 7,272,625 B1 * | 9/2007 | Hannel et al. ............... | 709/200 |
| 7,386,475 B2 * | 6/2008 | Parasnis et al. ............... | 705/26 |
| 2003/0069949 A1 * | 4/2003 | Chan et al. .................. | 709/221 |
| 2003/0162555 A1 * | 8/2003 | Loveland ..................... | 455/502 |
| 2004/0250258 A1 * | 12/2004 | Raghuvir et al. ............ | 719/315 |

(Continued)

OTHER PUBLICATIONS

"Models and Languages for Parallel Computation", David B. Skillicorn et al., ACM Computing Surveys, vol. 30, No. 2, Jun. 1998, pp.123-169.

"The State of the Art in Distributed Query Processing", Donald Kossmann, ACM Computing Surveys, vol. 32, No. 4, Dec. 2000, pp. 422-469.

"Policy-Based Networking Architecture and Algorithms", Dinesh C. Verma, New Riders Publishing 2001, Chapters 1,3,6,7,8,10.

*Primary Examiner*—Asad M Nawaz
*Assistant Examiner*—Farzana Huq
(74) *Attorney, Agent, or Firm*—Harrington & Smith (57) ABSTRACT

A policy for a computer system is transformed into a plurality of sub-policies, at least one synchronization step, and a final action. The sub-policies are distributed to corresponding sub-components in the computer system. The sub-policies are evaluated, wherein each sub-component evaluates its corresponding one or more sub-policies as other sub-components evaluate their corresponding one or more sub-policies. The sub-policies are synchronized by using the at least one synchronization step. The final action is performed in response to synchronizing the sub-policies. The computer system can be singular or distributed.

7 Claims, 4 Drawing Sheets

U.S. PATENT DOCUMENTS

| | | | |
|---|---|---|---|
| 2005/0047412 A1* | 3/2005 | Hares | 370/392 |
| 2005/0071222 A1* | 3/2005 | Bigus et al. | 705/14 |
| 2005/0198283 A1* | 9/2005 | Ramamoorthy et al. | 709/225 |
| 2006/0009991 A1* | 1/2006 | Jeng et al. | 705/1 |
| 2006/0136721 A1* | 6/2006 | Bruestle et al. | 713/168 |
| 2006/0224775 A1* | 10/2006 | Lee et al. | 709/248 |
| 2006/0242685 A1* | 10/2006 | Heard et al. | 726/3 |
| 2008/0005780 A1* | 1/2008 | Singleton | 726/1 |
| 2008/0077970 A1* | 3/2008 | Hares | 726/1 |
| 2008/0177689 A1* | 7/2008 | Jeng et al. | 706/47 |

\* cited by examiner

CONCURRENT EVALUATION OF POLICIES WITH SYNCHRONIZATION

TECHNICAL FIELD

This invention relates generally to computer systems and, more specifically, relates to policy evaluation on computer systems.

BACKGROUND OF THE INVENTION

A distributed computer system is a system in which a number of independent, singular computer systems cooperate through one or more networks. Because a distributed computer system has independent but cooperating singular computer systems, management of the distributed computer system can be complex. In response to this complexity, certain techniques have become popular for management of distributed computer systems.

One such management technique is the use of policies. A policy is an entity, typically a rule, that causes the distributed computer system or a portion thereof to perform some action. A policy usually is in the form of a condition and an action (typically called a condition-action pair), where the policy specifies the action to be performed when the condition evaluates to a particular state (e.g., "true"). In policy-based systems, conditional parts of policies are evaluated (e.g., on demand or on a regular basis), and if the condition part of any policy evaluates to true, the associated action is performed by the system. Use of policies to control the actions of distributed computer systems has become an important technique in computer systems management.

One problem, however, in such policy-based distributed computer systems is that when the condition, action or a part of the condition or action requires a substantially long time to perform, a distributed computer system exhibits poor response. Moreover, the distributed computer system will exhibit a very large and sudden resource usage spike in response to events that trigger policy evaluation and execution. This problem can be so severe that, in large-scale distributed computer systems, the condition evaluation and corresponding action may not complete before the next triggering of the condition.

As an example, consider a policy-based file migration system that finds candidates for moving files from one type of disk to another, when certain criteria specified in a policy are met. If the file system contains billions of files, it can take many hours or days to scan through the entire file system to identify migration candidates.

Thus, there is a need for more efficient policy evaluation that provides scalability and responsiveness.

BRIEF SUMMARY OF THE INVENTION

The foregoing and other problems are overcome, and other advantages are realized, in accordance with the presently preferred embodiments of these teachings. In particular, the present invention provides techniques for concurrent evaluation of policies with synchronization. These new techniques can provide better scalability and increased responsiveness as compared to conventional policy evaluation techniques.

For instance, techniques are disclosed for policy evaluation. A policy for a computer system is transformed into a plurality of sub-policies, at least one synchronization step, and a final action. The sub-policies are distributed to corresponding sub-components in the computer system. The sub-policies are evaluated, wherein each sub-component evaluates its corresponding one or more sub-policies as other sub-components evaluate their corresponding one or more sub-policies. The sub-policies are synchronized by using the at least one synchronization step. The final action is performed in response to synchronizing the sub-policies.

BRIEF DESCRIPTION OF THE DRAWINGS

The foregoing and other aspects of embodiments of this invention are made more evident in the following Detailed Description of the Invention, when read in conjunction with the attached Drawing Figures, wherein.

DETAILED DESCRIPTION OF EXEMPLARY EMBODIMENTS

Exemplary embodiments of the present invention are used for policy evaluation on computer systems. In particular, embodiments of the present invention can be used for management of distributed computer systems. As described above, a policy is typically a rule in a form of a condition-action pair. An aspect of the present invention is to transform a policy into sub-policies, one or more synchronization steps, and a final action. The sub-policies are concurrently evaluated by sub-components of a distributed computer system and then synchronized (e.g., using the one or more synchronization steps) and the final action performed so that an effect is created on the distributed computer system equivalent to policy execution without transformation of the policy into sub-policies.

As these exemplary techniques provide an opportunity to evaluate conditions of a sub-policy concurrently and potentially before the conditions of the other sub-policies are evaluated, significant efficiency and better responsiveness can be achieved in the evaluation of policy conditions. The sub-policy actions can also be performed concurrently and potentially even before the conditions and actions of other sub-policies are performed.

In one embodiment, the sub-policy actions are performed concurrently when the sub-policy actions are determined to be safe (e.g., do not affect the system behavior—as defined by one or more actions of the system—in observable ways). In another exemplary embodiment, the sub-policy actions are performed concurrently when the sub-policy actions can be undone. An example of a safe action is building a list of files that are older than 30 days when the date changes as per the clock maintained by a subcomponent. Building a list such as this is safe because the act of building is an internal operation of the subcomponent that is not visible to an external user or system. An example of an operation that can be undone is making an exact copy of a file on another disk, and this operation can be undone by removing the copy while keeping the original intact. An operation that can be undone may be considered as safe. The synchronization step and final action assure that the overall effect of policy evaluation through splitting a policy into sub-policies is equivalent to policy evaluation without transforming the policy.

Figure 1:
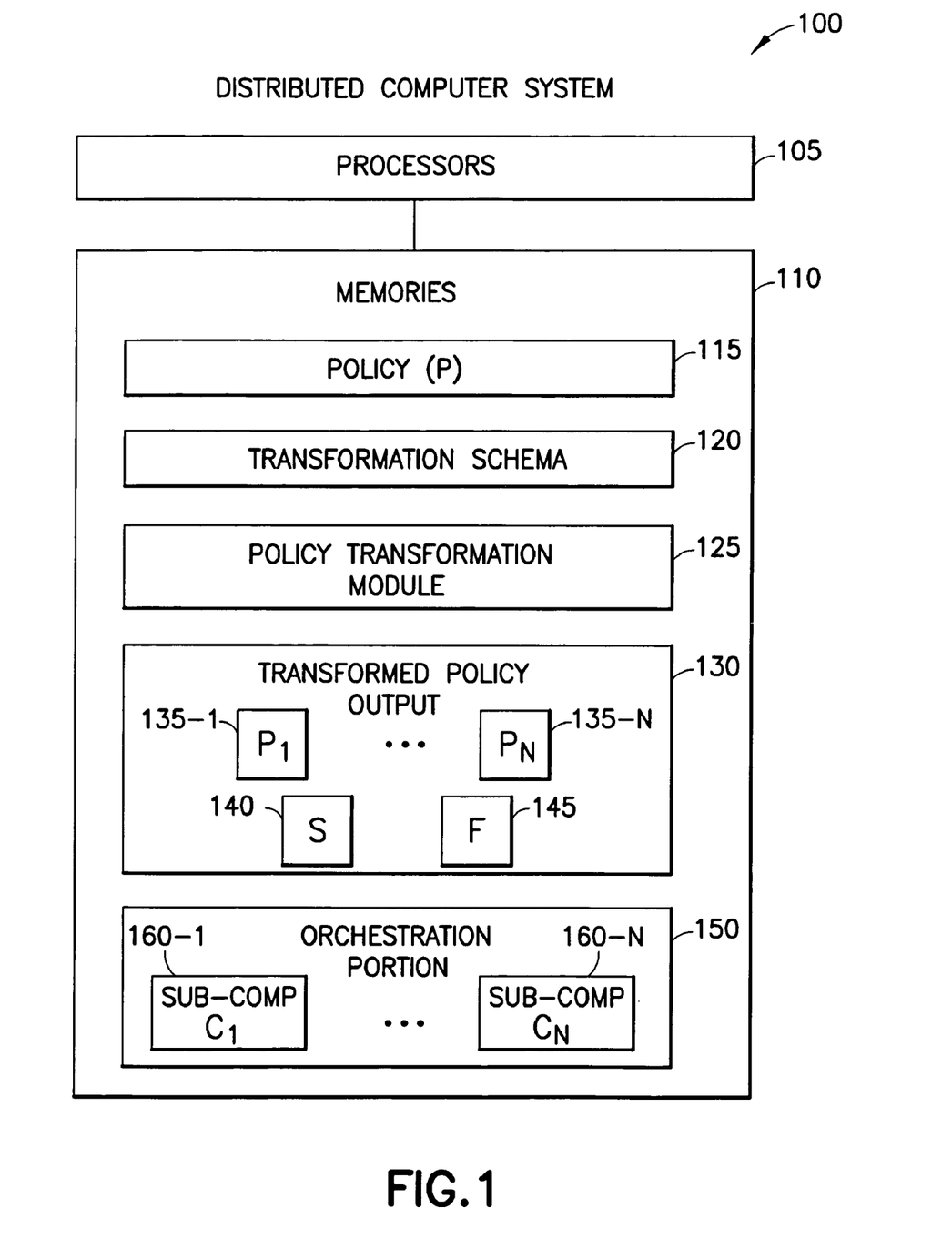
FIG. 1 is a block diagram of a distributed computer system adapted to perform exemplary embodiments of the present invention.
Figure 2:
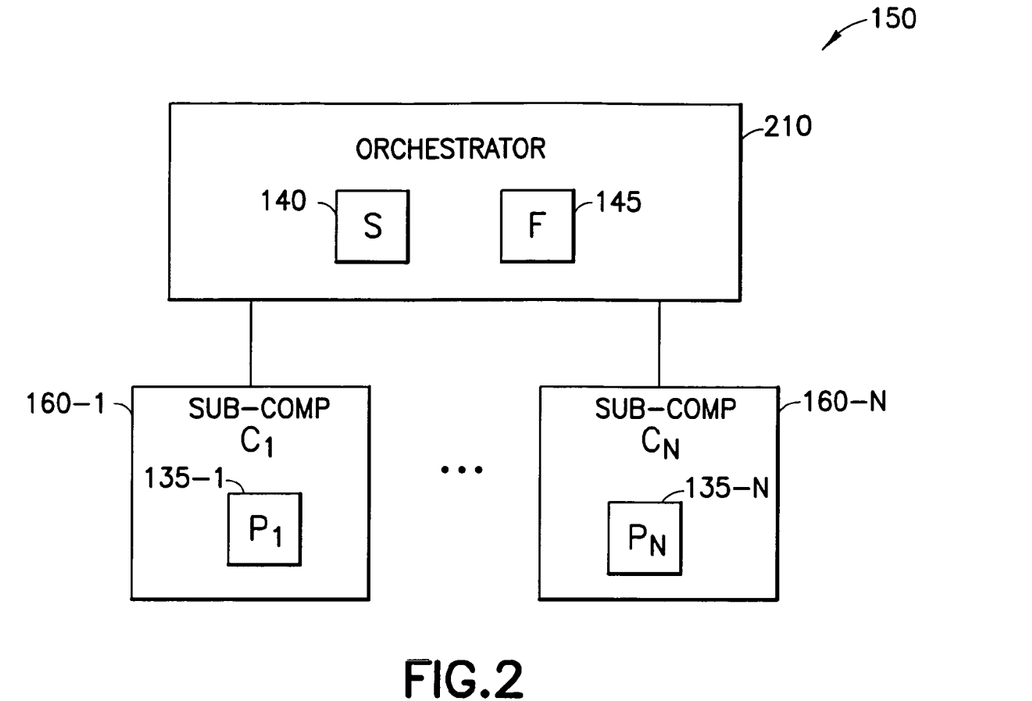
FIGS. 2 and 3 are each examples of an orchestration portion of the distributed computer system of FIG. 1.
Figure 3:
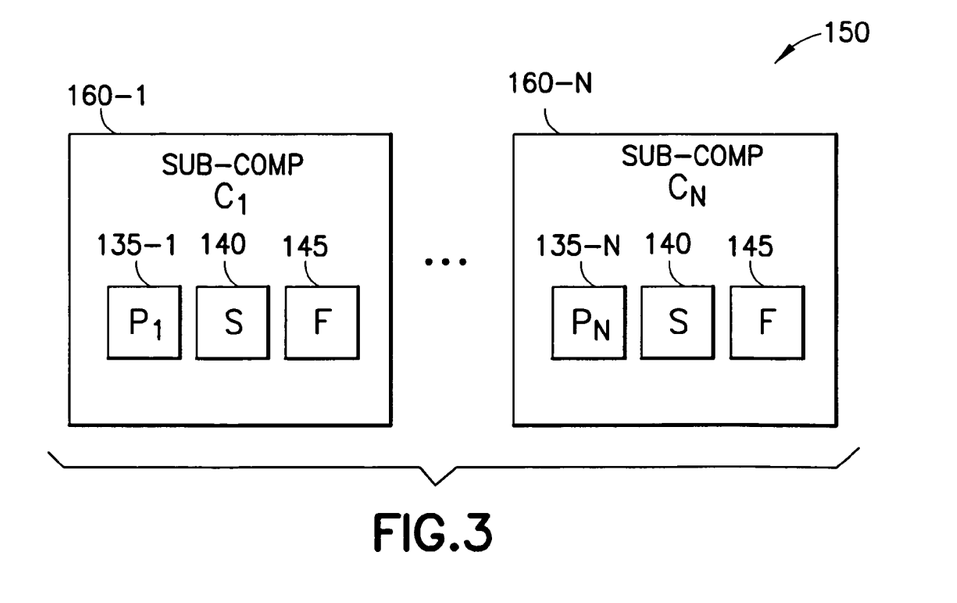

Turning now to FIG. 1, a distributed computer system 100 is shown that is adapted to perform exemplary embodiments of the present invention. Distributed computer system 100 comprises processors 105 coupled (e.g., through one or more networks) to memories 110. Memories 110 comprise a policy P 115, transformation schema 120, policy transformation module 125, transformed policy output 130, and an orchestration portion 150. Transformed policy output 130 comprises N sub-policies P1 135-1 through PN 135-N, a synchronization step S 140, and a final step F 145. Those skilled in the art may extend this exemplary embodiment in obvious ways to include a synchronization step that may in turn be composed of sub-synchronization steps, each of which may have further sub-sub-synchronization steps, and so on. Similarly, the finalization step may comprise sub-steps, each of which may be composed of sub-sub-steps, and so on. Orchestration portion 150 comprises N sub-components $C_1$ 160-1 through $C_N$ 160-N. Two examples of orchestration portion 150 are shown in FIGS. 2 and 3.

Although the present disclosure will refer to a distributed computer system 100, embodiments of the present invention are suitable for any computer system, such as a singular computer system, where sub-components of the system can evaluate policies.

As described in more detail below, in one exemplary embodiment, the policy transformation module 125 transforms, using transformation schema 120, the policy 115 into sub-policies 135, synchronization step 140, and final action 145. In an exemplary embodiment, the sub-policies 135, synchronization step 140, and final action 145 are communicated by the policy transformation module 125 to the orchestration portion 150. As is known in the art, the distributed computer system 100 can comprise a signal bearing medium tangibly embodying a program of machine-readable instructions executable by a digital processing apparatus (e.g., distributed computer system 100) to perform operations of the present invention.

Each of the sub-components 160 is a portion of the distributed computer system 100 suitable for performing an action. It should be noted that FIG. 1 describes N sub-policies 135 and N sub-components 160. Typically, this will be the case and is used herein to simplify exposition. Nonetheless, certain embodiments of the present invention may have N sub-policies 135 and M sub-components 160, where N is not equal to M. For instance, one selected sub-component 160 could have multiple sub-policies 135 distributed to the selected sub-component 160.

Figure 4:
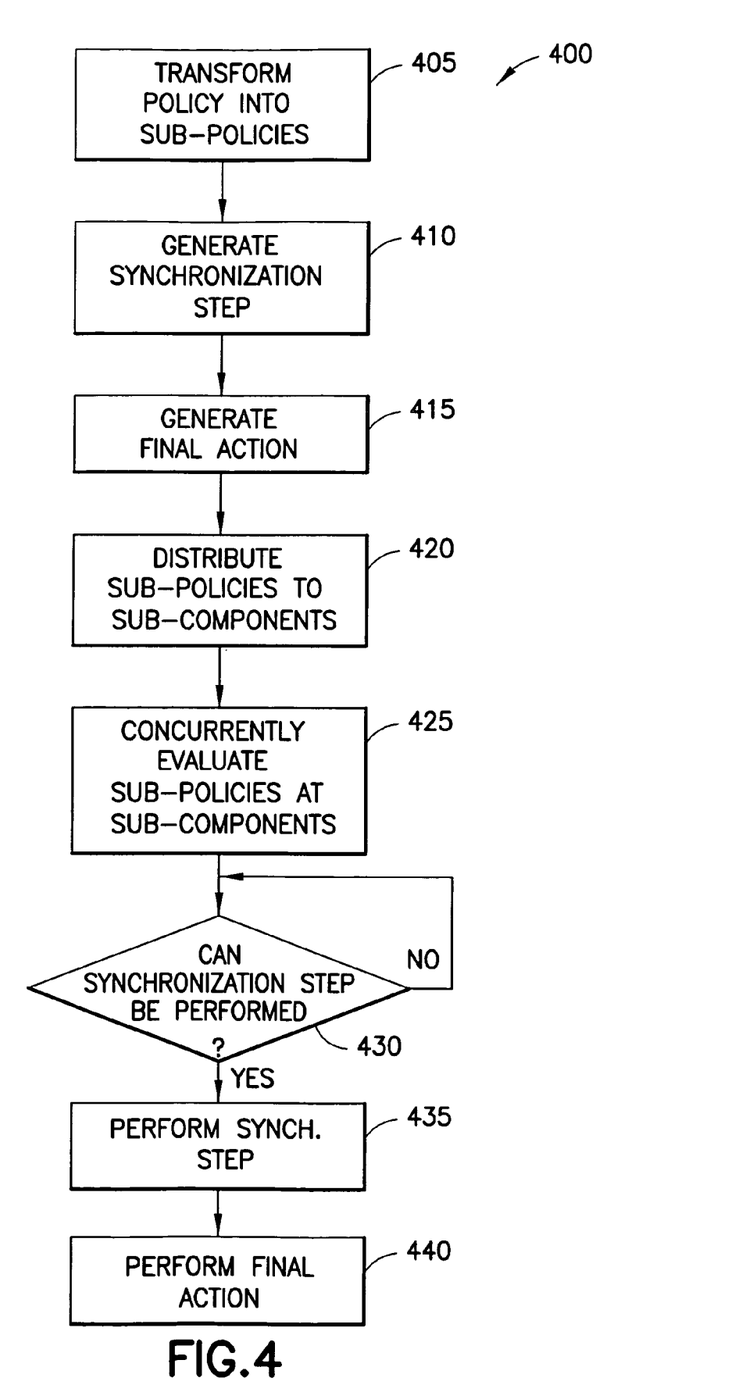
FIG. 4 is a flow chart of an exemplary method for concurrent evaluation of policies with synchronization.

Turning now to FIG. 4 with appropriate reference to FIG. 1, a method 400 is shown for concurrent evaluation of policies with synchronization. In step 405, policies are transformed into sub-policies (e.g., by the policy transformation module 125) through transforming conditions and actions of the policies. Consider an illustrative policy P 115, where P is specified as:

P: if (x) then A.

Policy P 115 is transformed (step 405) into sub-policies 135:

$P_1$: if ($x_1$) then $A_1$; and $P_2$: if ($x_2$) then $A_2$.

A synchronization step S 140 and final action F 145 are also generated (steps 410 and 415):

S: F.

In the above example, x, $x_1$, and $x_2$ are Boolean conditions, A, $A_1$, $A_2$, and F are actions. The Boolean conditions $x_1$ and $x_2$ will be called "sub-conditions" herein, and the actions $A_1$ and $A_2$ will be called "sub-actions" herein.

The transformation may be achieved, in an exemplary embodiment, using applicable methodologies to obtain concurrency in executing the sub-policies. One exemplary way to transform policies 115 is to view policies 115 as if-then statements in such standard languages as C/C++ and Java, and then perform policy transformation known in convention techniques for program translation. Another exemplary way to carry out policy transformation is to apply convention techniques in extensible schema language (XSL) (and hence extensible markup language, XML). An exemplary embodiment for this invention comprises using an XML schema (e.g., transformation schema 120) to describe the transformations and using a Java program to read the transformation schema 120 and apply the transformation. The present invention is, however, not limited to any schema (or the use thereof) or any programming language. The transformation schema 120 specifies translation for each policy type. Those skilled in the art may use similar techniques with or without an explicit transformation schema 120.

In an exemplary embodiment, the transformation schema 120, for policies of the type for which P is an instance, describes a decomposition such that condition x is equivalent to the logical "and" operation of sub-conditions $x_1$ and $x_2$, and the effects of action A on the distributed computer system 100 are equivalent to the effects of sub-actions $A_1$, $A_2$ and F performed sequentially (e.g., where $A_1$ and $A_2$ are performed prior to F). Thus, the synchronization step 140 comprises the logical "and" operation of sub-conditions $x_1$ and $x_2$.

In more general terms, the condition x can be decomposed into a decomposition having a number of sub-conditions $x_1 \ldots x_n$ and appropriate logic operations performed on the sub-conditions, wherein the decomposition is equivalent to the condition. The synchronization step 140 performs the appropriate logic operations for synchronization. One result of performing the appropriate logic operations is selection of sub-actions (e.g., "$A_1$ and $A_2$" selects both $A_1$ and $A_2$, while "$A_1$ or $A_2$" selects one of $A_1$ or $A_2$). The effects of action A on the distributed computer system 100 are equivalent to the effects of the selected sub-actions and the final action F performed sequentially (e.g., where the selected sub-actions are performed prior to the final action F).

It should be noted that steps 405, 410 and 415 may be considered to be and performed as one single step that transforms a policy P 115 into sub-policies 135, a synchronization step 140, and a final action 145.

Having accomplished transformation of a policy P 115 into sub-policies (step 405), the sub-policies 135 are distributed (step 420) to sub-components 160 of the system, and synchronization is set up between the sub-components 160 according to synchronization requirements (e.g., at least partially defined by synchronization step 140). Generally, the policy transformation module 125 will distribute the sub-policies 135, but other methods may be used. For instance, each sub-component 160 could periodically request (e.g., from the policy transformation module 125 or some other device in distributed computer system 100) a sub-policy. There are several techniques for orchestrating synchronization. FIGS. 2 and 3 show two exemplary systems for orchestrating synchronization and the final action 145.

Referring now to FIG. 2 in addition to FIG. 4, an example of the orchestration portion 150 of the distributed computer system 100 is shown. Orchestration portion 150 comprises orchestrator 210 and sub-components 160. The orchestrator 210 comprises synchronization step 140 and final action 145. Each sub-component 160 comprises a policy 135. The sub-policies 135 have been distributed (e.g., by the policy transformation module 125 of FIG. 1 or by the orchestrator 210) to corresponding ones of the sub-components 160. Each sub-component 160 evaluates its corresponding sub-policy 135 while other sub-components 160 evaluate their corresponding sub-policies 135 (step 425). For instance, sub-component 135-1 evaluates sub-policy $P_1$ 135-1 while sub-component 135-2 evaluates sub-policy $P_2$ 135-2. Thus, there is concurrent evaluation of sub-policies 135 within the distributed computer system 100. An evaluation of a sub-policy 135 typically includes performance of a corresponding sub-action. The term "evaluate" is to include the ability to evaluate a sub-policy 135 even if an actual determination of whether a sub-condition is a value (e.g., "true" or "false") has not yet occurred or is not occurring.

In this example, the orchestrator 210 communicates with each of the sub-components 160 and orchestrates performance of the synchronization step 140 and the final action 145. For instance, the orchestrator 210 determines when one or more of the sub-components 160 have evaluated corresponding sub-policies 135, when the synchronization step 140 can be performed (step 430), and performs (step 430=Yes) the synchronization step 140 (step 435) and final action 145 (step 440) in response to a determination that the synchronization step 140 can be performed (step 430=Yes). If the synchronization step 140 cannot be performed (step 430=No), the orchestrator 210 waits in step 430.

Turning now to FIG. 3 in addition to FIG. 4, another example of orchestration portion 150 of distributed computer system 100 is shown. In the illustration of FIG. 3, each of the sub-components 160 comprises a corresponding sub-policy 135, the synchronization step 140 and the final action 145. In FIG. 3, orchestration of performance of the synchronization step 140 and the final action 145 is spread amongst each of the sub-components 160. Typically, the first sub-component 160 to evaluate its corresponding sub-policy will perform steps 430, 435, and 440. For example, a given sub-component 160 would typically evaluate its corresponding sub-policy 135 (step 425) then determine whether the synchronization step 140 can be performed (step 430), and perform the synchronization step 140 (step 435) and final action 145 (step 440) in response to the determination that the synchronization step 140 can be performed (step 430=Yes). To determine whether the synchronization step 140 can be performed (step 430), the sub-component 160 communicates with other sub-components 160.

Several examples will now be presented of concurrent evaluation of policies with synchronization. In these examples, either of the orchestration portions 150 of FIGS. 2 and 3 (e.g., or some combination thereof) may be used to orchestrate the synchronization step 140 and the final action 145.

First, an example of concurrent evaluation of policies with synchronization using two sub-policies 135 will be given. For a policy P 115 of "if (x) then A", sub-policies $P_1$ 135-1 ("if $(x_1)$ then $A_1$") and $P_2$ 135-2 ("if $(x_2)$ then $A_2$") are distributed to sub-components $C_1$ 160-1 and $C_2$ 160-2, respectively. A synchronization step S 140 is set up for sub-components $C_1$ 160-1 and $C_2$ 160-2.

Each sub-component 160 communicates with (e.g., receives or subscribes to) input (e.g., which may be null) that allows the sub-components 160 to evaluate sub-conditions of their corresponding sub-policies 135. The communication and evaluation takes place concurrently (e.g., independently) in each of the sub-components 160.

Sub-components $C_1$ 160-1 and $C_2$ 160-2 evaluate sub-conditions $x_1$ and $x_2$, respectively, once, periodically, when some event is triggered, or some combination of these, and when sub-conditions for the sub-components 160-1 and 160-3 are satisfied, the sub-components 160-1 and 160-2 execute corresponding sub-actions $A_1$ and $A_2$, respectively, also concurrently.

When needed or periodically, sub-components 160 have their evaluations of sub-conditions $x_1$ and $x_2$ synchronized. One technique used for this is, in FIG. 2, communication with the orchestrator 210. For instance, the orchestrator 210 could periodically communicate with each sub-component 160, requesting status of evaluations. As another example, each sub-component 160 could periodically communicate status of evaluation of sub-conditions to the orchestrator 210. As yet another example, a sub-component 160 could wait until the sub-condition was evaluated (e.g., and when a corresponding sub-action performed) then communicate status of evaluation (e.g., and performance). In FIG. 3, a given sub-component 160 can query (e.g., periodically or once sub-conditions are evaluated and/or a sub-action performed) other sub-components 160 as to the status of evaluations. Once at least one of the sub-components 160 performs associated sub-actions, a synchronization step 140 is performed.

Accordingly, for the example policy, synchronization of sub-policies $P_1$ 160-1 and $P_2$ 160-2 occurs when the sub-condition for sub-policy $P_1$ 160-1 evaluates to true (e.g., and the sub-action for the policy $P_1$ 160-1 has been performed, and when the sub-condition for sub-policy $P_2$ 160-2 evaluates to true (e.g., and the sub-action for the policy $P_2$ 160-2 has been performed). The synchronization step 140 is the logical operation "and" of the outcomes of sub-conditions $x_1$ and $x_2$. The synchronization step 140 may be performed, illustratively, by the orchestrator 210 in FIG. 2 or by one of sub-components 160 (e.g., the sub-component 160 that first has its corresponding sub-condition evaluate to true) in FIG. 3. Note that when the synchronization step 140 is the logical operation "or" of conditions $x_1$ and $x_2$, the synchronization step 140 occurs when it is determined (e.g., by a orchestrator 210 or one of the sub-components 160) that one of the conditions $x_1$ or $x_2$ evaluates to a particular value (typically, true) and that only one condition need be evaluated to satisfy the synchronization step 140. Also note that in FIG. 3, appropriate coherency techniques may be used to prevent multiple performance of the final action 145.

Once the synchronization step 140 is completed, a final action 145 is carried out (e.g., by the orchestrator 210 in FIG. 2 or by one of the sub-components 160 in FIG. 3), which in an exemplary embodiment may combine or integrate results of the sub-actions and then perform additional actions.

As a way of further explanation, consider the following, even more specific example of a policy P 115:

If (fileAge>30 days) and (time=03:00 hrs) migrate files from Pool1 to Pool2.

The policy P 115 states that 30 day old files are to be migrated from the storage pool Pool1 to storage pool Pool2 everyday at 3 a.m. in the morning. Relating this example to the more generic example used earlier, $x_1$ is "(file age>30 days)", $x_2$ is (time=03:00 hrs), $A_1$ is "add file to a specific list", $A_2$ is a null action which completes in zero time, the synchronization step 140 comprises a logical "and" operation on [$x_1$, $A_1$] and [$x_2$, $A_2$] sub-policies, and the final action 145 after synchronization is obtaining the specific list built in A1 and migrate files on the list from Pool1 to Pool2. The execution model in this example is that the sub-component receiving the sub-policy [$x_1$, $A_1$] starts evaluating the policy as soon as the day changes (because the condition refers to age determination based on number of days) and adds the selected files to a specific list intended for this sub-policy and the day on which this sub-policy is being evaluated. It is also a part of the execution model in this example that the sub-policies are generated from the original policy and distributed to subcomponents when the original policy is activated.

The following paragraphs teach exemplary techniques for transforming a conditional part of a policy into sub-conditions. It is a well known theorem that any Boolean expression can be transformed into an equivalent expression in conjunctive normal form. There is a companion theorem that any Boolean expression can be transformed into an equivalent expression in disjunctive normal form. It can be shown that two Boolean expressions are equivalent if they evaluate to the same truth value for all possible assignments to the constituent variables. These theorems are direct consequences and applications of the basic laws of Boolean algebra:

a) ~(E1 and E2)<==>~E1 or ~E2;
b) ~(E1 or E2)<==>~E1 and ~E2;
c) E1 and (E2 or E3)<==>(E1 and E2) or (E1 and E3); and
d) E1 or (E2 and E3)<==>(E1 or E2) and (E1 or E3), where (a) and (b) use DeMorgan's Law and (c) uses algebraic distribution. Also both operators "or" and "and" are associative and commutative. Using these basic rules, those skilled in the art can find equivalent conjunctive or disjunctive expressions for a given arbitrary Boolean expression.

As mentioned earlier, in the realm of systems governed by policies, each individual policy is generally a rule of the form:

P: if (x) then A.

The conditional part x is generally a Boolean expression, which can be written in its logical conjunctive form, and therefore the policy can be re-written as:

P: if ($x_1$ and $x_2$) then A.

An action A can be split into a sequence of sub-actions, and if the action A is split in such a way that it is equivalent to sub-actions $A_1$ and $A_2$ followed by sub-action F, then $A_1$ and $A_2$ will be sub-actions for the sub-policies and F will be the finalization sub-action after a synchronization step. The actual process of identifying $A_1$, $A_2$, and F may involve human administration and can be specified using a graphical user interface (GUI) or a script. So, as a result of the preceding discussion, the sub-policies can be written as:

$P_1$: if ($x_1$) then $A_1$,
$P_2$: if ($x_2$) then $A_2$; and
Final sub-action F after synchronization.

For those skilled in the art, it is apparent how to extend the policy splitting to policies with conjunctions of more than two expressions, and hence more than two sub-policies. The sub-policies (e.g., sub-conditions and sub-actions) can be evaluated concurrently.

For many domains, it is possible to use the mechanical, algebraic manipulations shown above to re-write the policies so as to satisfy the independent evaluation condition. In general, this does require a human administrator or an intelligent software system to know which terms of a Boolean expression and sub-actions of a policy can be independently evaluated and to use that knowledge to guide the manipulations. But in many practical applications this is straightforward—policies often state what to do when there is a confluence of events, physical properties of system resources, time of day and year and so on. For practical purposes, in many systems, the status of each of a class of resources does not change often and can be monitored, measured, and tested independently of other classes of resources, independently of time of day and year.

Figure 5:
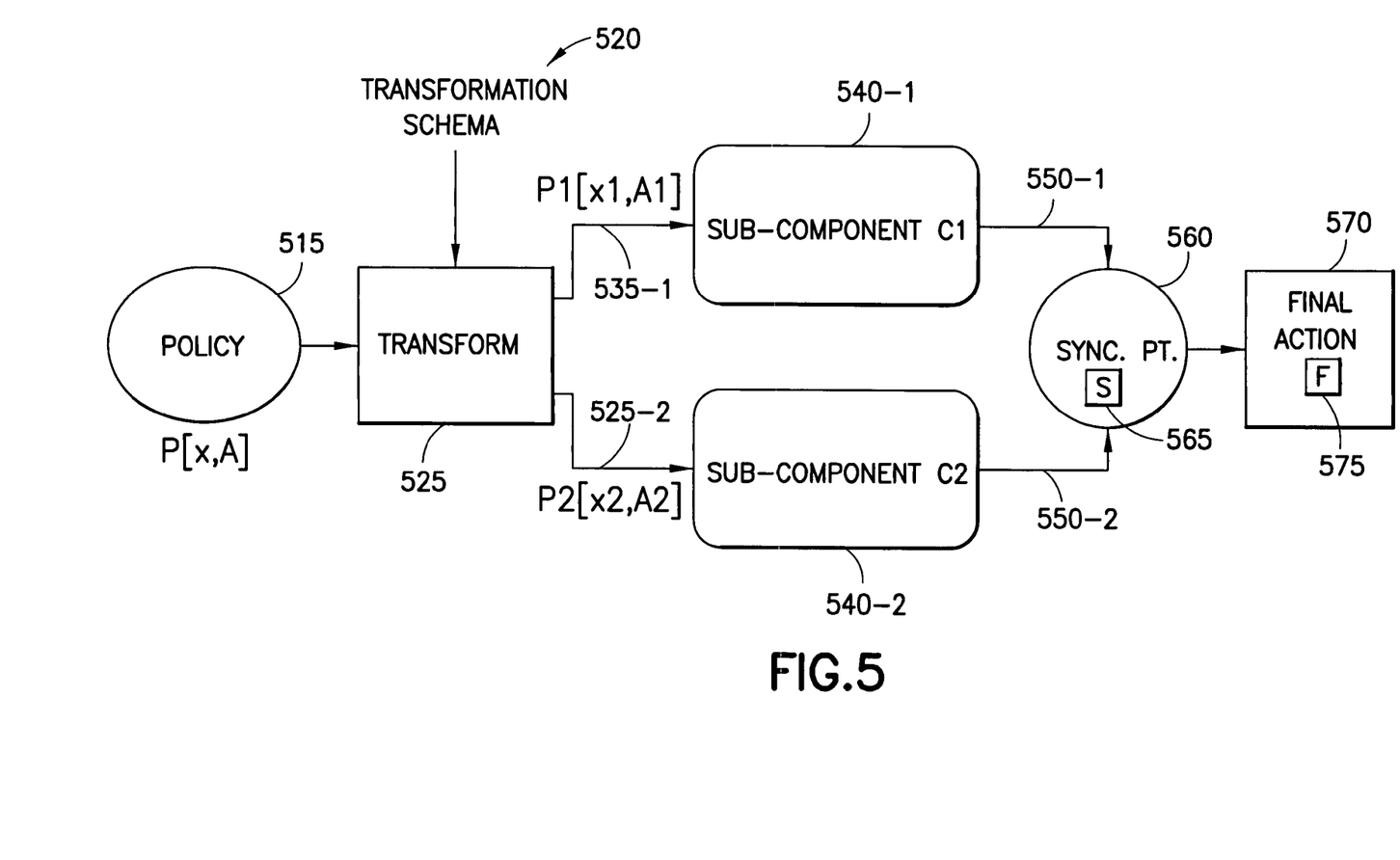
FIG. 5 is a flow diagram illustrating an exemplary flow for concurrent evaluation of policies with synchronization.

Referring now to FIG. 5, a flow diagram is shown of a flow 500 for concurrent evaluation of policies with synchronization. Flow 500 is a second example of concurrent evaluation of policies with synchronization. In flow 500, a policy P 515 of the form "if (x) then A" is shown in shorthand as P[x,A]. Module 525 performs a transformation, using transformation schema 520, to create sub-policies $P_1$ 515-1 and $P_2$ 535-2. Sub-policy $P_1$ 515-1 is of the form "if ($x_1$) then $A_1$" and is written in shorthand as P1[x1, A1] (where x1 is a sub-condition and A1 is a sub-action) and sub-policy $P_2$ 515-2 is of the form "if ($x_2$) then $A_2$" and is written in shorthand as P2[x2, A2] (where x2 is a sub-condition and A2 is a sub-action). The sub-policies $P_1$ 515-1 and $P_2$ 535-2 are distributed to the sub-components $C_1$ 540-1 and $C_2$ 540-2, respectively. Each sub-component 540 performs a communication 550 with a synchronization point 560. The communication 550 is typically that a sub-condition has been evaluated (e.g., to either true or false). When the sub-condition is true, the communication 550 may also include status (e.g., complete or incomplete) of a corresponding sub-action. Synchronization point 560 performs a synchronization step 565, and a final action module 570 performs a final action 575.

As previously described with regard to FIGS. 2 and 3, the synchronization point 560 and final action module 570 may be performed by a device separate from the sub-components 540 or may be performed by one or more of the sub-components 570.

Flow 500 also illustrates that while all the sub-components 540 evaluate concurrently, there is also a place (e.g., synchronization point 560 and synchronization step 565) at which evaluations are synchronized. The synchronization allows the final action 575 to be performed.

As a third example of concurrent evaluation of policies with synchronization, consider a complex distributed computer system comprising many replaceable parts and an autonomic service manager. Each of the replaceable parts is to be periodically or even continually monitored for performance and correct functioning. There is an inventory of replaceable parts, some of which are performance upgrades and some of which are one-for-one replacements. There are workers that can be dispatched to replace parts. The following policies exist in the distributed computer system:

(i) policies about when upgrade replacements should be done, e.g., only during third shift operations or on holidays but only when the system is running at 50 percent of capacity or less and parts must be in-stock and only if there are idle workers on duty;

(ii) policies about when to replace malfunctioning components, e.g. part must be in-stock and there must be a worker on duty; and (iii) policies about when to order replacement parts, e.g., inventory is low and there is money in the budget.

For case (i), a policy might be of the form:
if ($x_1$: part p of type t is performing sub-par in subsystem s) and ($x_2$: system utilization is less than 50%) and ($x_3$: inventory(t)>0) and ($x_4$: idle workers>0) then assign an idle worker to pick up a part of type t and use it to replace part p in subsystem s.

In the exemplary policy, a "subsystem" is a portion of a distributed computer system. To apply an embodiment of the present invention, an autonomic service manager is structured comprising sub-components $C_1$, $C_2$, $C_3$, and $C_4$ (e.g., sub-components 540 of FIG. 5) that monitor sub-conditions $x_1$, $x_2$, $x_3$, and $x_4$. The synchronization point (e.g., synchronization point 560 in FIG. 5) receives messages from the sub-components $C_1$ through $C_4$ and determines when all conditions are satisfied for any particular part, subsystem and worker. In this example, a synchronization step (e.g., synchronization step 565 of FIG. 5) comprises the determination that all conditions are satisfied for any particular part, subsystem and worker. When the synchronization point makes such a determination, the synchronization point invokes the final action module (e.g., final action module 570 of FIG. 5) to perform the final action F (e.g., final action 575), which in this example is to issue orders for a part replacement. Cases (ii) and (iii) above are structurally similar, albeit somewhat simpler.

Those familiar with the art can extend the method and apparatus to include synchronization of conditions that take place periodically rather than at one time, and to multiple sets of synchronization points (e.g., each synchronization point comprising a synchronization step) and sub-policies.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. Nonetheless, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the present invention, and not in limitation thereof.

What is claimed is:

1. A method for policy evaluation, comprising:
generating for a computer system a plurality of sub-policies from a policy, at least one synchronization step, and a final action,
where a result generated from of the plurality of sub-policies, the at least one synchronization step, and the final action is equivalent to a result generated by execution of the policy;
distributing the sub-policies to corresponding sub-components in the computer system;
evaluating the sub-policies, where each sub-component evaluates its corresponding one or more sub-policies as other sub-components evaluate their corresponding one or more sub-policies;
synchronizing the sub-policies by using the at least one synchronization step; and
performing the final action in response to synchronizing the sub-policies
where the policy comprises a condition and an action and where generating further comprises generating so that each of the sub-policies comprises a sub-condition and a sub-action,
where evaluating sub-policies further comprises determining that sub-conditions for given sub-policies evaluate to an evaluation value of at least two values; and for the sub-actions corresponding to the sub-conditions that evaluate to the evaluation value, performing the following steps:
determining if a given sub-action is safe; and
performing the given sub-action in response to the given sub-action being determined as safe,
where the at least one synchronization step comprises a plurality of synchronization steps where each of the plurality of synchronization steps corresponds to a set of sub-policies; synchronizing the sub-policies further comprises synchronizing all of the sets of sub-policies by using a corresponding synchronization step for each of the sets; and performing the final action further comprises performing the final action in response to synchronizing all of the sets of sub-policies,
where at least one of the at least one synchronization step comprises a plurality of sub-steps, and synchronizing further comprises synchronizing at least a portion of the sub-policies by using the plurality of sub-steps of the at least one synchronization step,
where the final action comprises a plurality of sub-steps; and performing the final action further comprises performing the sub-steps of the final action in response to synchronizing the sub-policies.

2. The method of claim 1, wherein:
generating further comprises decomposing the condition into a decomposition comprising the sub-conditions and appropriate logic operations on the sub-conditions; and
synchronizing the sub-policies further comprises selecting, by performing the appropriate logic operations of the sub-conditions, a set of the sub-actions, wherein the appropriate logic operations are defined by the synchronization step.

3. The method of claim 2, wherein synchronizing the sub-policies further comprises performing each of the sub-actions in the set of actions prior to performing the final action.

4. The method of claim 3, wherein synchronizing the sub-policies further comprises performing each of the sub-actions in the set of actions prior to synchronizing the sub-policies.

5. The method of claim 1, wherein synchronizing the sub-policies and performing the final action are performed by one or more of an orchestrator and one or more of the sub-components, where the orchestrator is configured to orchestrate synchronizing and performing the final action.

6. The method of claim 1, wherein synchronizing the sub-policies and performing the final action are performed by an orchestrator able to communicate with each of the sub-components evaluating a distributed sub-policy, where the orchestrator is configured to orchestrate synchronizing and performing the final action.

7. The method of claim 6, wherein the final action comprises one or more sub-actions, and wherein performing the final action further comprises the orchestrator directing one or more of the sub-components in the computer system to perform the one or more sub-actions.

* * * * *